(12) United States Patent
Kageyama et al.

(10) Patent No.: US 7,578,769 B2
(45) Date of Patent: Aug. 25, 2009

(54) LOCKUP CONTROL DEVICE

(75) Inventors: Yuzo Kageyama, Isehara (JP);
Tomohiko Takahashi, Isehara (JP)

(73) Assignee: Nissan Motor Co., Ltd., Yokohama, Kanagawa (JP)

( * ) Notice: Subject to any disclaimer, the term of this patent is extended or adjusted under 35 U.S.C. 154(b) by 433 days.

(21) Appl. No.: 11/499,105

(22) Filed: Aug. 4, 2006

(65) Prior Publication Data

US 2007/0060443 A1  Mar. 15, 2007

(30) Foreign Application Priority Data

Aug. 5, 2005 (JP) ............... 2005-227648
Jul. 24, 2006 (JP) ............... 2006-200242

(51) Int. Cl.
*F16H 61/14* (2006.01)
*F16D 48/06* (2006.01)

(52) U.S. Cl. ..................... 477/169; 477/171

(58) Field of Classification Search ............ 475/65; 477/62, 64, 169, 171, 175, 180
See application file for complete search history.

(56) References Cited

U.S. PATENT DOCUMENTS

| 5,551,932 A | * | 9/1996 | Ishii et al. ............ 477/168 |
| 5,649,881 A | * | 7/1997 | Iizuka .................. 477/169 |
| 6,597,979 B2 | * | 7/2003 | Hagiwara et al. ....... 701/67 |
| 7,252,620 B2 | * | 8/2007 | Kiuchi ................. 477/62 |
| 7,282,009 B2 | * | 10/2007 | Sekiya et al. .......... 477/64 |
| 2005/0137059 A1 | * | 6/2005 | Takahashi ............. 477/169 |

FOREIGN PATENT DOCUMENTS

| JP | 06-307535 | 11/1994 |
| JP | 11-159608 | 6/1999 |
| JP | 2001-330127 | 11/2001 |

* cited by examiner

*Primary Examiner*—Roger Pang
(74) *Attorney, Agent, or Firm*—Young Basile (57) ABSTRACT

Excellent fuel consumption and drivability are achieved by properly controlling the lockup-canceling timing in a vehicle with an automatic transmission equipped with a torque converter having lockup features. Conventionally, the lockup got cancelled when it was determined that the vehicle speed was lower than a first lockup-canceling vehicle speed used when the accelerator was OFF at the same time the brakes were OFF. Herein, however a delay timer is activated after the accelerator is released (OFF) to set a second lockup-canceling vehicle speed, which is slower than the first lockup-canceling vehicle speed and which is used when the brake is activated (ON). As a result, the lockup will not be cancelled until the vehicle speed reaches the second vehicle speed, and the lockup period can be ensured for a longer period of time.

37 Claims, 7 Drawing Sheets

LOCKUP CONTROL DEVICE

CROSS-REFERENCE TO RELATED APPLICATIONS

The present application claims priority to Japanese Patent Application Serial Nos. P2005-227648 filed Aug. 5, 2005, and P2006-200242 filed Jul. 24, 2006, the entire contents of which are expressly incorporated by reference herein.

TECHNICAL FIELD OF THE INVENTION

The present invention relates to a lockup control device and control method thereof, and especially relates to technology for a control device capable of switching lockup-canceling features depending on driving conditions in an automatic transmission equipped with a torque converter having lockup features.

BACKGROUND

As shown in cited Japanese Laid Open Patent Publication Nos. JP(A) H6-307535 and JP(A) H11-159608, for a vehicle loaded with an automatic transmission equipped with a torque converter having lockup features, fuel consumption improvement is attempted by locking up the converter under different conditions, such as driving at a predetermined speed or more and other accelerator statuses.

Moreover, in cited Japanese Laid Open Patent Publication No. JP(A) 2001-330127, a vehicle is equipped with a continuously variable transmission as the automatic transmission.

However, prolongation of the fuel-cut time is normally attempted when a vehicle is coasting by achieving a lockup state, thus sustaining a constant engine rpm and making the lockup-canceling vehicle speed as low as possible.

When this lockup occurs during the coasting period, it makes the driver feel as though the engine brake has been applied, but this engine brake feeling is less objectionable for the driver when the driver has intentionally stepped on the brake pedal when the brake is ON than when the brake is OFF.

Therefore, the lockup-canceling vehicle speed can be set to the lower vehicle speed side when the brake is ON compared to when the brake is OFF.

However, when the driver changes the leg position from the accelerator pedal to the brake pedal (accelerator OFF and brake ON) while the vehicle is moving at a steady state or accelerating with the automatic transmission locked up at a vehicle speed that is higher than the lockup-canceling vehicle speed for the brake ON status but lower than the lockup-canceling vehicle speed for the brake OFF status, the status goes through the accelerator OFF status and the brake OFF status while the driver is changing the leg position, causing the lockup to be cancelled.

Therefore, this causes a problem in that the fuel-cut time is shortened and the fuel consumption rate deteriorates.

It also causes other problems in that shortening of the fuel-cut time cannot be avoided even if the lockup state is restored by detecting the brake ON status after the lockup is cancelled due to the delay that occurs between the two states, resulting in poorer drivability of the vehicle due to the fluctuation of the engine rpm that occurs when returning to the lockup state.

Furthermore, it causes similar problems associated with fuel consumption and drivability when the driver changes the leg position from the brake pedal to the accelerator pedal (brake OFF and accelerator ON) while the vehicle is decelerating with the brake turned ON at a vehicle speed that is higher than the lockup-canceling vehicle speed for the brake ON status but lower than the lockup-canceling vehicle speed for the brake OFF status, because the lockup state gets cancelled while the driver is changing the leg position.

SUMMARY

In view of these problems with the conventional technology, the objective of the present invention is to improve both the fuel consumption rate and the drivability of a vehicle at the same time by properly setting the lockup-canceling vehicle speed depending on the driving status.

In order to achieve the aforementioned objective, the present invention pertains to a lockup control device for a vehicle loaded with an automatic transmission equipped with a torque converter having lockup features in which the lockup-canceling vehicle speed for when the accelerator is released and the brake is activated is set to be lower than the lockup-canceling vehicle speed for when both the accelerator and the brake are released; wherein the present invention is constituted so that the lockup-canceling vehicle speed is set to the lockup-canceling vehicle speed for when the accelerator is released (OFF) and the brake is activated (ON) within a predetermined period of time after detecting a status shift from the accelerator activated (ON) state to the released (OFF) state while under the lockup state.

Furthermore, the present invention is constituted so that the lockup-canceling vehicle speed is set to the lockup-canceling vehicle speed for when the accelerator is released (OFF) and the brake is activated (ON) within a predetermined period of time after detecting a status shift to the brake released (OFF) status while under the lock-up state with the accelerator released (OFF) and the brake activated (ON).

Such a constitution makes it possible to maintain the lockup state without the lockup state being canceled during any switching operation because the lockup-canceling vehicle speed will not be switched to the lockup-canceling vehicle speed for when both the accelerator and the brake are released (OFF) within a predetermined period of time after detecting a switchover to the accelerator released (OFF) status while under the lockup state with the accelerator activated (ON), or for a predetermined period of time after detecting a switchover to the brake released (OFF) status while under the lockup state with the brake activated (ON).

In this manner, maintaining the lockup state also allows for better fuel consumption and drivability of the vehicle.

DETAILED DESCRIPTION OF EMBODIMENTS OF THE INVENTION

A description of the Embodiment of the present invention is given below with reference to the drawings. The same or similar reference symbols will be used for those portions in the drawings that are the same or similar.

Figure 1:
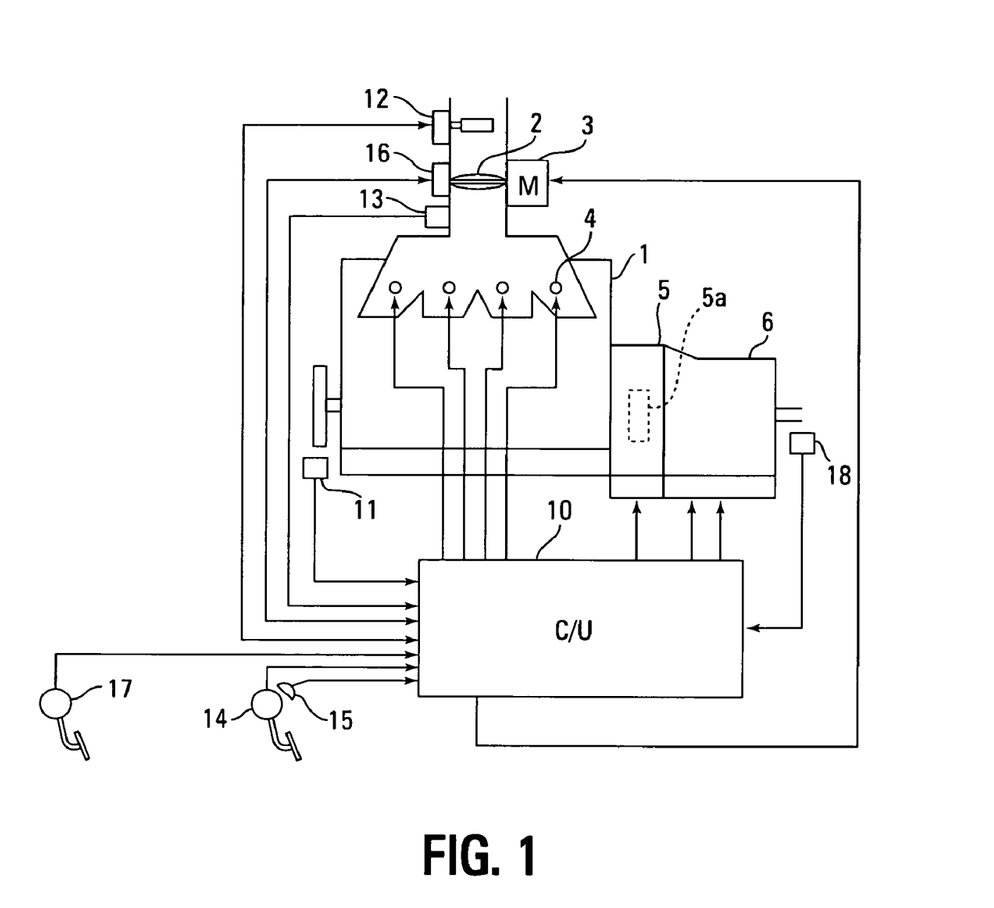
FIG. 1 is a system diagram showing an embodiment of the present invention.

Next is provided a preferred embodiment of the present invention with reference to the drawings. FIG. 1 is a system drawing showing an embodiment of the present invention.

An electrically controlled throttle valve 2 for the induction system of engine 1 is connected to a stepping motor (or a servo motor) 3, which functions as a throttle actuator, and this motor 3 is driven by signals from a control unit 10.

A fuel injection valve 4 is provided for each cylinder of the engine 1, and each valve 4 is driven by signals from control unit 10.

Control unit 10 receives signals from crank angle sensor 11 that is capable of detecting engine rpm Ne, airflow meter 12 for detecting intake air volume Qa, negative pressure sensor 13 for detecting intake negative pressure Pb, accelerator opening sensor 14 for detecting the opening degree of the accelerator (the amount of stepping on the accelerator pedal) APO, idling switch 15 which turns ON when said accelerator pedal opening APO is less than a predetermined opening, throttle opening sensor 16 for detecting the throttle valve opening (opening of the throttle valve 2) TVO, brake switch 17 that turns ON when the brake is activated (ON), and vehicle speed sensor 18 for detecting the vehicle speed VSP.

At this point, control unit 10 determines the target throttle opening based primarily on the accelerator opening APO by means of a built-in microcomputer, and controls the opening of the electrically controlled throttle valve 2 via the motor 3 so that it reaches this target throttle opening.

Control unit 10 also calculates the amount of fuel injection that corresponds with the target air-fuel ratio based on the intake air volume Qa (or intake negative pressure Pb) and the engine rpm Ne, and outputs the injection pulse signal that has a pulse width that corresponds to the amount of fuel injection at a predetermined timing that synchronizes with the engine rpm to fuel injection valve 4 of each cylinder to carry out fuel injection. On the other hand, control unit 10 cuts fuel during the deceleration period by halting the fuel injection of the fuel injection valve 4 until the engine rpm Ne drops to the predetermined recovery rpm.

Continuous variable transmission (CVT) 6 is connected to the output side of engine 1 as an automatic transmission via torque converter 5 equipped with a lockup mechanism.

Figure 2:
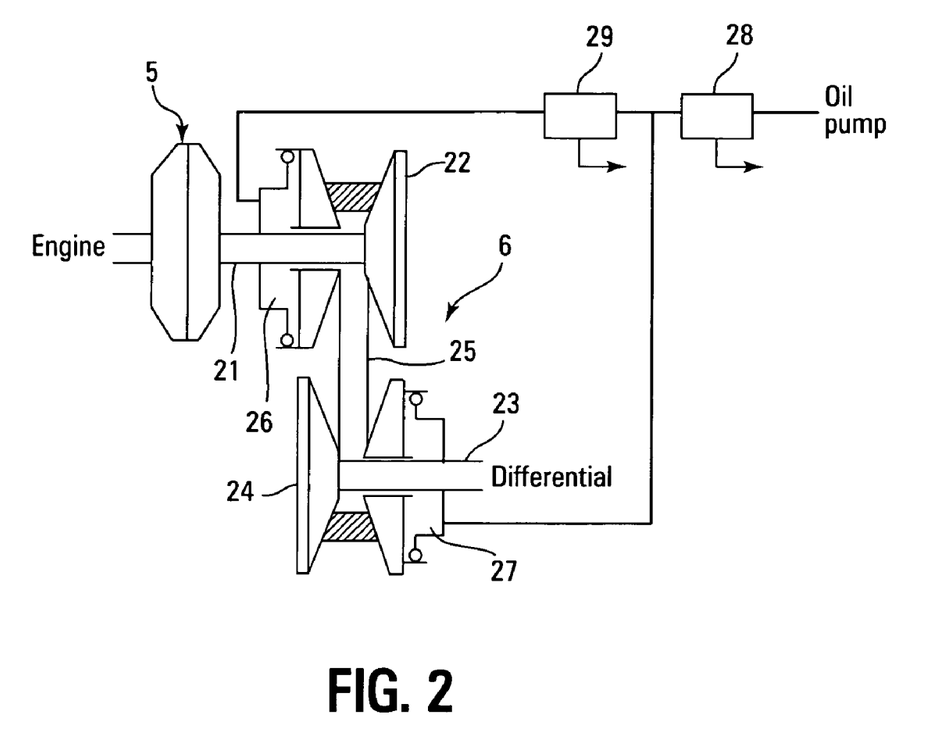
FIG. 2 is a system diagram of the automatic transmission side.

FIG. 2 is a system diagram for the automatic transmission side.

The continuously variable transmission (CVT) 6 has: a primary pulley 22 connected to the output shaft of the engine via torque converter 5 equipped with lock-up mechanism 5a and whose effective diameter on the side of input shaft 21 is continuously variable; a secondary pulley 24 whose effective diameter on the side of output shaft 23 (differential side) is continuously variable; a belt 25 that spans across these pulleys 22 and 24; a primary side cylinder 26 that acts on primary pulley 22 to expand the pulley diameter when it receives the primary pressure (speed changing pressure); and a secondary side cylinder 27 that acts on secondary pulley 24 to expand the pulley diameter when it receives the line pressure.

The line pressure that is input to secondary side cylinder 27 is generated from the source hydraulic pressure from an oil pump (not shown) by means of line pressure control valve 28, which has a relief function.

In addition, the primary pressure input to primary side cylinder 26 is generated from line pressure by means of speed control valve 29, which has a relief function. Therefore, although the primary pressure is always lower than the line pressure, the pressure receiving area of primary side cylinder 26 is set to be larger than the pressure receiving area of secondary side cylinder 27, so that the speed change ratio can be changed continuously by changing the pulley ratio by means of controlling the ratio of the primary pressure to the line pressure (primary pressure/line pressure).

Line pressure control valve 28 and speed control valve 29 are duty-controlled by control unit 10. At this point, control unit 10 controls line pressure control valve 28 and speed control valve 29 in order to control the line pressure and the primary pressure (speed change ratio) by means of the built-in microcomputer based on various input signals.

In other words, the target line pressure is calculated based on the throttle valve opening TVO (or Accelerator Pedal Opening APO) referencing a predetermined table. The line pressure is controlled to achieve the target line pressure by duty-controlling line pressure control valve 28. Moreover, the target speed change ratio is calculated based on the accelerator pedal opening APO and the vehicle speed VSP referencing the speed change map. Speed control valve 29 is duty-controlled in order to achieve this target speed change ratio and the ratio of the primary pressure relative to the line pressure is controlled in order to control the speed change ratio.

Control unit 10 is normally divided into the engine control unit and the transmission control unit, which communicate with each other via communication lines, but they are shown as one unit in the drawing to allow for simpler explanation.

In the aforementioned torque converter 5 equipped with the lockup mechanism, lockup mechanism 5a gets locked up based on the vehicle speed VSP detected by vehicle speed sensor 18 and the accelerator pedal opening APO detected by accelerator opening sensor 14, but the lockup gets cancelled when the vehicle speed drops below the predetermined threshold during the deceleration.

In consideration of the different sensations experienced by the driver when the engine brake is applied, depending on whether the driver applies the brakes or not, the lockup-canceling vehicle speed for when the accelerator is released (OFF) with the idling switch 15 turned ON and the brake is activated (ON) with brake switch 17 turned ON is set lower than the lockup-canceling vehicle speed for when the accelerator is released (OFF) and the brake is released (OFF) with brake switch 17 turned OFF.

However, that feature alone results in a poor fuel consumption rate and reduced drivability, as mentioned before, because the lockup will be canceled when the vehicle speed is determined to have reached the lockup-canceling vehicle speed, when the brake is activated (ON) and the accelerator is released (OFF), or when the brake is released (OFF) and the accelerator is activated (ON), while the vehicle is driven at a speed higher than the lockup-canceling vehicle speed specified for the brake ON status but lower than that lockup-canceling vehicle speed specified for the brake OFF status while the transmission is locked up.

Therefore, the present invention provides a constitution that prevents the lockup from being cancelled during the switching procedure by maintaining the lockup-canceling vehicle speed for when the accelerator is released (OFF) and the brake is activated (ON) for a predetermined period of time when the accelerator is released (OFF) and then the brake is activated (ON) or when the brake is released (OFF) and then the accelerator is activated (ON) with the transmission locked up.

Figure 3:
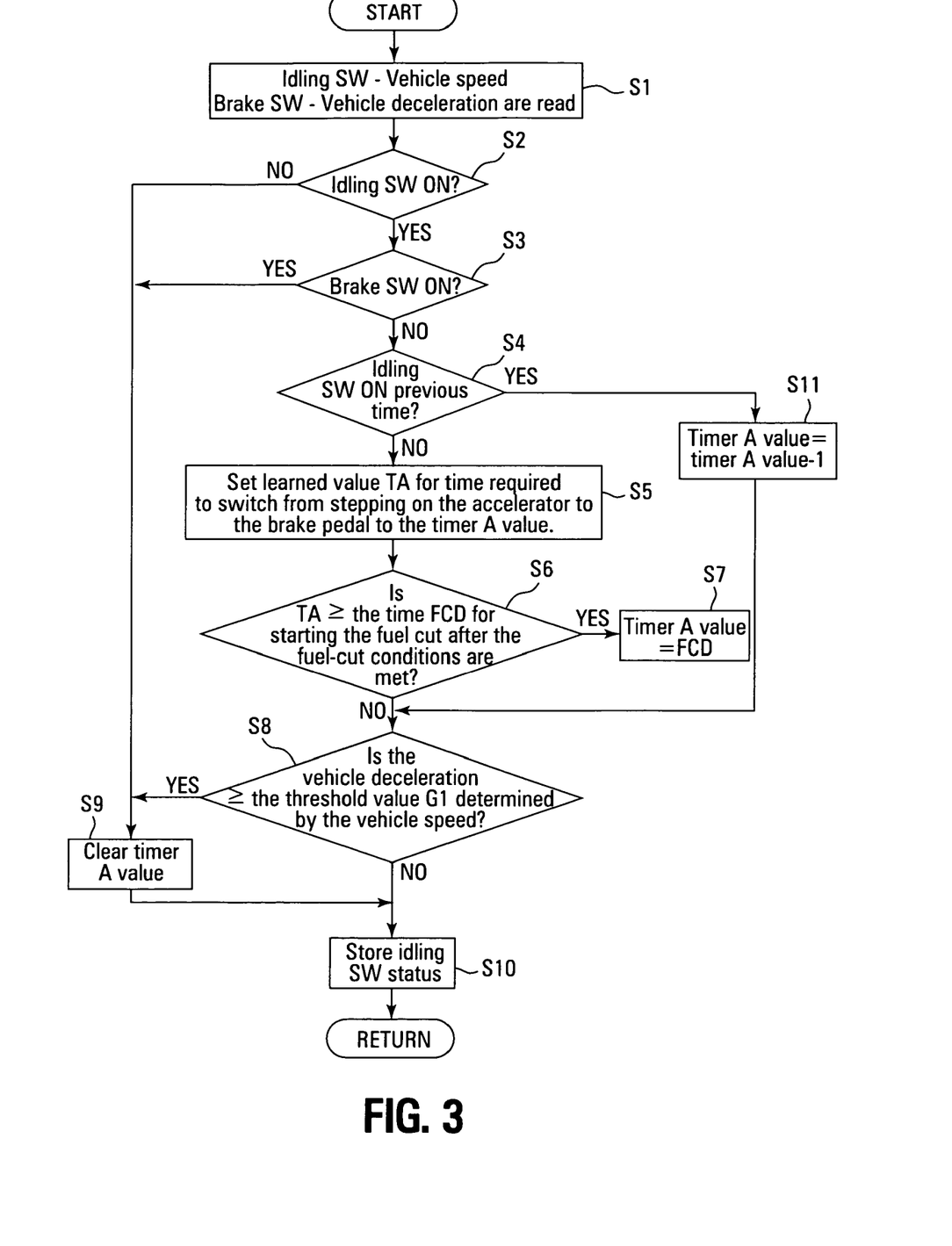
FIG. 3 is a flowchart of a routine for driving a delay timer A while releasing the accelerator (OFF) and activating the brake (ON) in the lockup state.

FIG. 3 shows the flowchart of the routine for driving the delay timer intended for preventing the lockup cancellation immediately after the switching that takes place when releasing the accelerator (OFF) and activating the brake (ON) while the transmission is locked up.

In step S1, the ON/OFF state of idling switch 15, the vehicle speed VSP detected by vehicle speed sensor 18, the ON/OFF state of brake switch 17, and the vehicle deceleration DVSP calculated from the vehicle speed are read.

In step S2, it is determined whether or not idling switch 15 is ON.

When idling switch 15 is determined to be ON, the program advances to step S3 and determines whether or not brake switch 17 is ON.

If brake switch 17 is determined to be ON in step S3, the program advances to step S4 and determines whether or not idling switch 15 was ON when checked the previous time.

If it is determined in step S4 that idling switch 15 was OFF the previous time, or, in other words, if it is determined immediately after the accelerator was switched from ON to OFF, the program advances to step S5 and the learned value TA for the time required for switching from the release of the accelerator (OFF) (the idling switch is ON) to the activation of the brake (the brake switch is ON), in other words, the time required to shift the driver's leg position from the accelerator pedal to the brake pedal, is set to delay timer A.

At step S6, it is determined whether or not learned value TA is larger than the time FCD for starting the fuel cut after the fuel cut condition under the deceleration state has been met.

If it is determined at step S6 that TA≧FCD, the program advances to step S7 to reset the timer A to FCD. This process is performed in order to prevent a feeling of discomfort from the engine brake being applied too heavily as the fuel cut starts while the transmission is still locked up.

At step S6, after it is determined that TA<FCD, or the value for timer A is switched to FCD in step S7, the program advances to step S8 and it is determined whether or not the vehicle deceleration DVSP is equal to or higher than threshold value G1 that was set in accordance with the vehicle speed VSP.

If it is determined at step S8 that DVSP≧G1, the program advances to step S9 and the value for timer A is cleared to 0.

If it is determined at step S8 that DVSP<G1, the program advances to step S10 to store the state (ON, OFF) of idling switch 15 for this cycle to be used as the previous cycle value determined at step S4.

Then for the next cycle and thereafter, if idling switch 15 is determined to be ON, the program advances to step S11 and the aforementioned value of timer A is decremented by one value at a time, the program advances to step S8, and if is determined that DVSP≧G1 before the value of timer A becomes 0, the program advances to step S9 and the value for timer A is cleared to 0.

Figure 4:
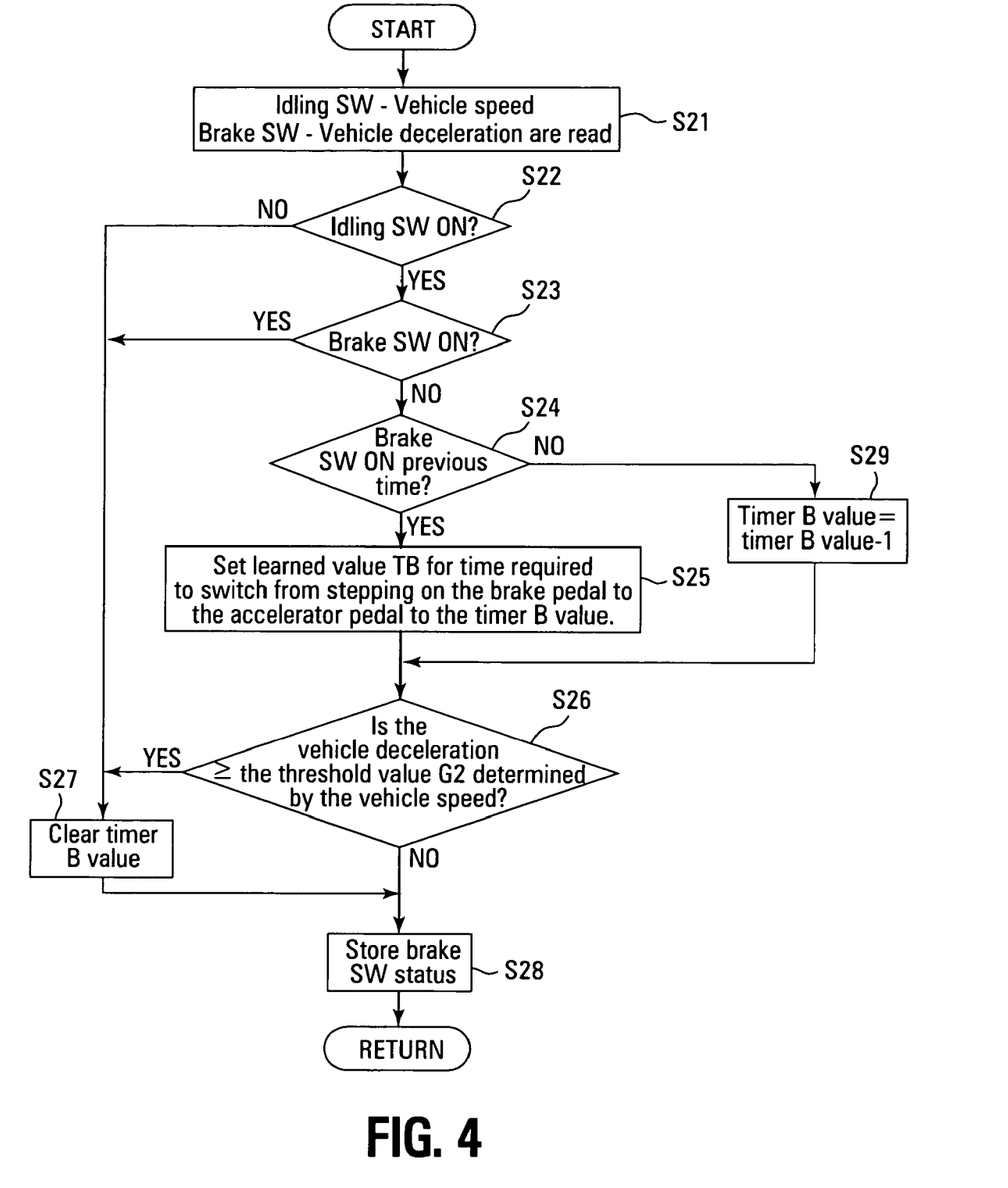
FIG. 4 is a flowchart of a routine for driving a delay timer B while releasing the brake (OFF) and activating the accelerator (ON) in the lockup state.

FIG. 4 shows the flowchart of the routine for driving the delay timer intended for preventing the lockup cancellation immediately after the switching takes place when releasing the brake (OFF) and activating the accelerator (ON) while the transmission is locked up.

In step S21, the ON/OFF state of idling switch 15, the vehicle speed VSP detected by vehicle speed sensor 18, the ON/OFF state of brake switch 17, and the vehicle deceleration DVSP calculated from the vehicle speed are read.

In step S22, it is determined whether or not idling switch 15 is ON.

When idling switch 15 is determined to be ON, the program advances to step S23 and determines whether or not brake switch 17 is ON.

If brake switch 17 is determined to be OFF in step S23, the program advances to step S24 to determine whether or not brake switch 17 was OFF when checked the previous time.

If it is determined in step S24 that brake switch 17 was ON the previous time, or, in other words, it determined immediately after the brake was switched from ON to OFF, the program advances to step S25 and the learned value TB for the time required for switching from the release of the brake (OFF) (the brake switch transitions from ON to OFF) to the activation of the accelerator (ON) (the idling switch transitions from ON to OFF), in other words, the time required for shifting the driver's leg position from the brake pedal to the accelerator pedal, is set to delay timer B.

In step S26, it is determined whether or not the vehicle deceleration DVSP is higher than threshold value G2 that was set in accordance with the vehicle speed VSP.

If it is determined at step S26 that DVSP≧G2, the program advances to step S27 and the value of timer B is cleared to 0.

If it is determined at step S26 that DVSP<G2, the program advances to step S28 to store the state (ON, OFF) of brake switch 17 for this cycle to be used as the previous cycle value at step S24.

Then for the next cycle and thereafter, if brake switch 17 is determined to be OFF the previous time at step S24, the program advances to step S29 and the value of timer B is decremented by one value at a time. The program then advances to step S26, and if it is determined that DVSP≧G2 before the value of timer B becomes 0, the program advances to step S27 and the value for timer B is cleared to 0.

Figure 5:
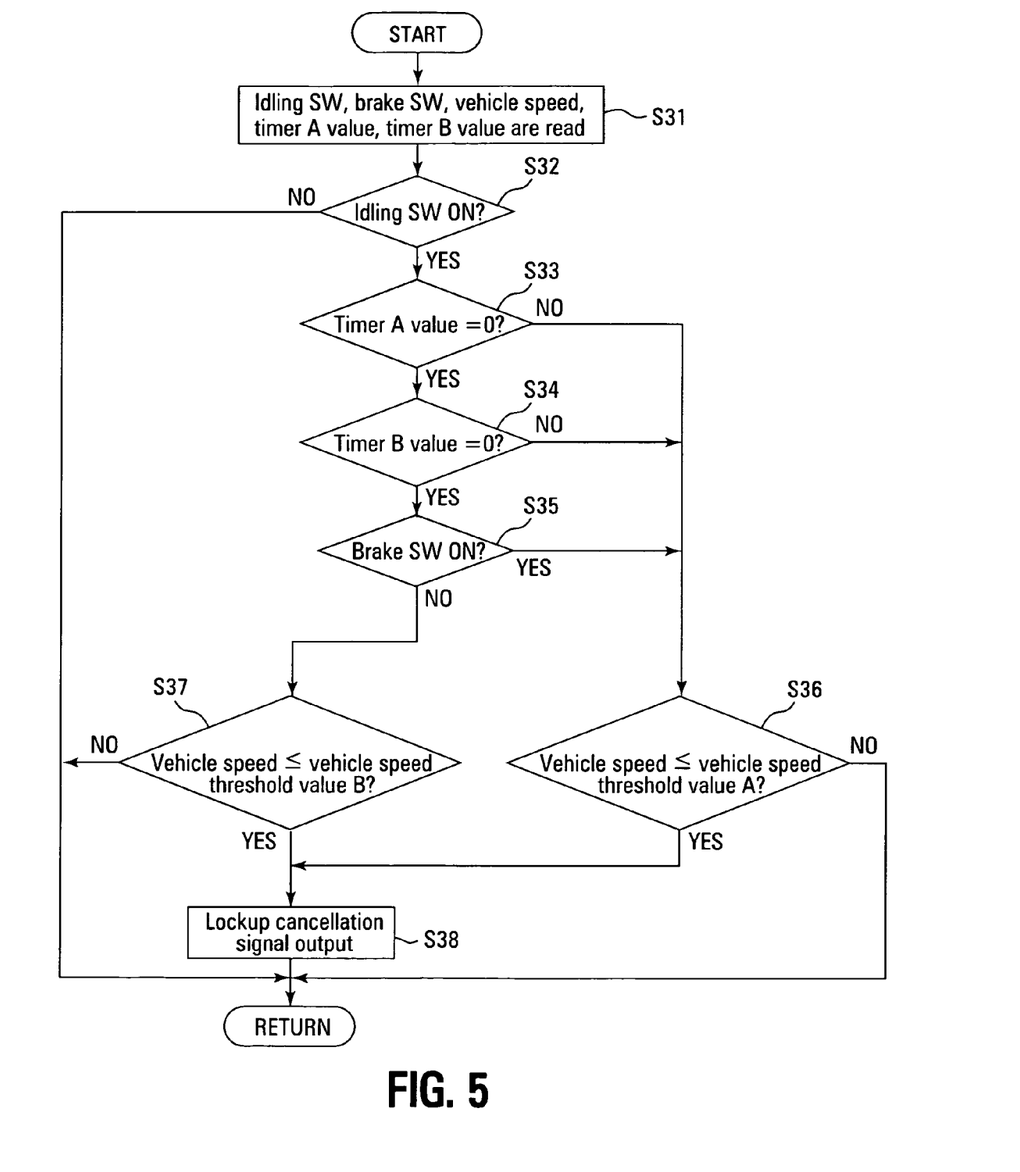
FIG. 5 is a flowchart of a control routine for switching the lockup-canceling vehicle speeds using timer values A and B.

FIG. 5 is a flowchart showing the control routine for switching the lockup-canceling vehicle speeds using aforementioned timer values A and B.

In step S31, the ON/OFF state of idling switch 15, the ON/OFF state of brake switch 17, the vehicle speed VSP detected by vehicle speed sensor 18 and the timer values A and B set up in the aforementioned routines are read.

In step S32, it is determined whether or not idle switch 15 is ON.

If it is determined that idling switch 15 is ON at step S32, the program advances to step S33 and it is determined whether or not the value of timer A has been cleared to 0.

If it is determined that the value of timer A was cleared to 0 at step S33, the program advances to step S34 and it is determined whether or not the value of timer B has been cleared to 0.

If it is determined that the value of timer B was cleared to 0 in step S34, the program advances to step S35 and it is determined whether or not brake switch 17 is ON.

If it is determined in either step S33 or S34 that the timer values A or B are not 0, or if it is determined in step S35 that brake switch 17 is ON, the program advances to step S36 and determines whether or not the vehicle speed VSP has become lower than the lockup-canceling vehicle speed A for when the accelerator is released (OFF) and the brake is activated (ON), and advances to step S38 when VSP≦A and outputs the lockup cancellation signal.

In other words, the lockup-canceling vehicle speed is maintained to lockup-canceling vehicle speed A, which is set to a lower speed than the speed specified for when the brake is released (OFF) while in the accelerator released (OFF)/brake activated (ON) state, by means of the delay operation of delay timer A, from the time that the accelerator pedal is released (OFF) until the brake pedal is stepped on or activated, except when the vehicle deceleration is large (in which case the value of timer A will be cleared to 0).

In addition, the vehicle speed is maintained at the aforementioned lockup-canceling vehicle speed A by means of the delay operation of delay timer B from the time that the brake pedal is released (OFF) until the brake pedal is stepped on or activated (ON), except when the vehicle deceleration is large (in which case the value of timer B will be cleared to 0). In this case, the output of the lockup cancellation instruction is terminated when idling switch 15 is switched OFF as the accelerator is activated (ON).

Such a process makes it possible to maintain the vehicle speed at lockup-canceling vehicle speed A for the brake activated (ON) state without it being switched to lockup-canceling vehicle speed B for the brake released (OFF) state during said pedal-shifting process, so that the lockup state is ensured until the vehicle speed drops below aforementioned lockup-canceling vehicle speed A, and as a result, favorable fuel consumption and drivability can be maintained.

Moreover, if the vehicle speed is maintained at lockup-canceling speed A when the vehicle decelerates substantially during said the pedal-shifting process, the engine brake gets applied too heavily, so by switching the vehicle speed to lockup-canceling vehicle speed B the amount of engine brake applied can be properly controlled.

On the other hand, if it is determined at step S35 that brake switch 17 is OFF, or, in other words, both the accelerator and the brake have been released (OFF) and timer values A and B have both been cleared to 0, the program advances to step S37 and it is determined whether or not the vehicle speed VSP has dropped below lockup-canceling vehicle speed B for when the accelerator is released (OFF) and the brake is released (OFF), and advances to step S38 if VSP≦B and outputs the lockup cancellation signal.

In other words, the vehicle can be controlled properly without causing too much engine braking by simply releasing the accelerator (OFF) without having to activate the brake when in the accelerator released (OFF)/brake released (OFF) state, by means of canceling the lockup at lockup-canceling vehicle speed B, which is set to be higher than lockup-canceling vehicle speed A, for the brake activated (ON) state. In particular, for a continuous variable transmission, the slower the speed, the more the gear is shifted to the low gear side and the stronger the engine braking becomes, so it is possible to maintain the engine braking to a proper level by canceling the lockup before lockup-canceling vehicle speed B is reached when there is less demand by the driver to decelerate and the brake is released (OFF).

In addition, timer values A and B must be cleared in order for lockup cancellation to take place at lockup-canceling vehicle speed B, but the lockup cancellation delays for only a short amount of time, which is set on the timer, at least when engine braking is anticipated by releasing the accelerator (accelerator OFF), and timer values A and B will be forcibly cleared and the lockup will be cancelled immediately without a problem if the vehicle deceleration is large.

Figure 6:
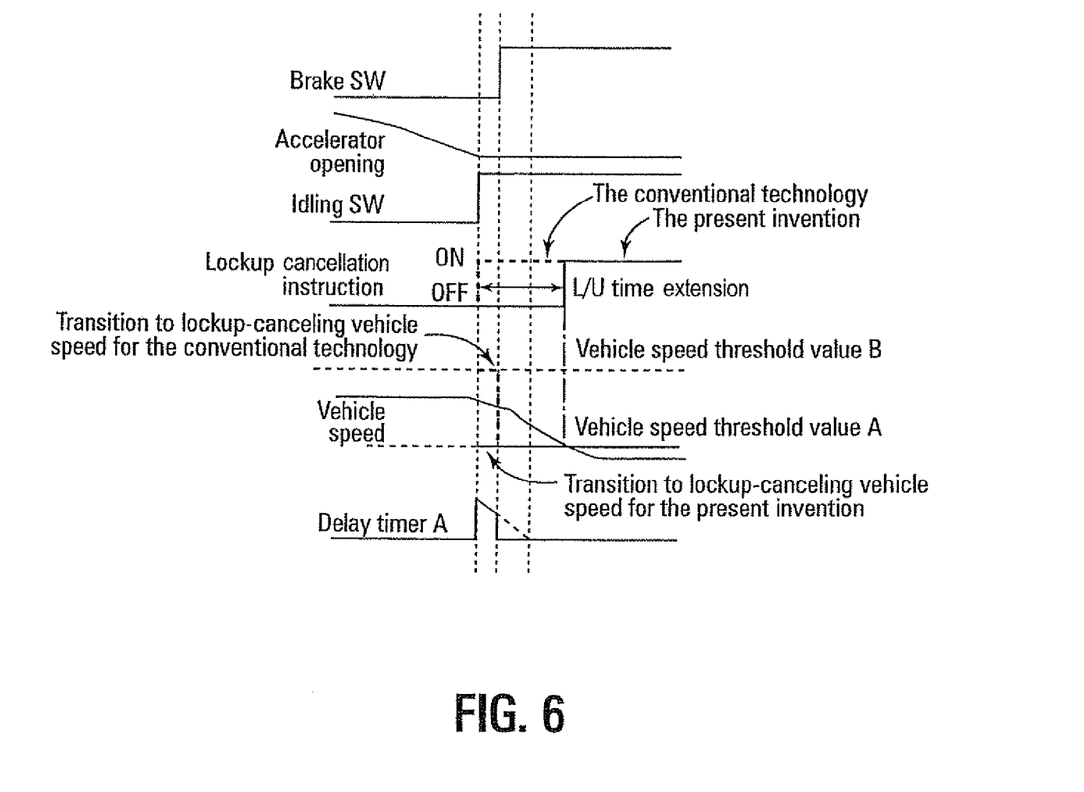
FIG. 6 is a time chart showing the deceleration status for when the accelerator is released (OFF) and the brake is activated (ON) in the lockup state.

FIG. 6 shows the status for when deceleration is effectuated by releasing the accelerator (OFF) and activating the brake (ON) when the transmission is in a lockup state at a vehicle speed lower than lockup cancellation vehicle speed B, whereby it is determined that the vehicle speed is lower than the lockup canceling vehicle speed B that was set at the same time that the accelerator was released (OFF), as was the case in conventional technology, and the lockup state is cancelled.

On the contrary, in the present embodiment, delay timer A is activated after the accelerator is released (OFF) to set lockup-canceling vehicle speed A, so that the lockup will not be cancelled until the vehicle speed reaches said vehicle speed A and the lockup period is ensured for a longer period of time.

Although the aforementioned explanation does not refer to the second conventional method in which the transmission is locked up again after the lockup is cancelled by switching to the lockup-canceling vehicle speed at the same time that the brake is activated (ON), the lockup period is shortened in this method as well, and rpm fluctuation caused by the relocking results in poor drivability.

Figure 7:
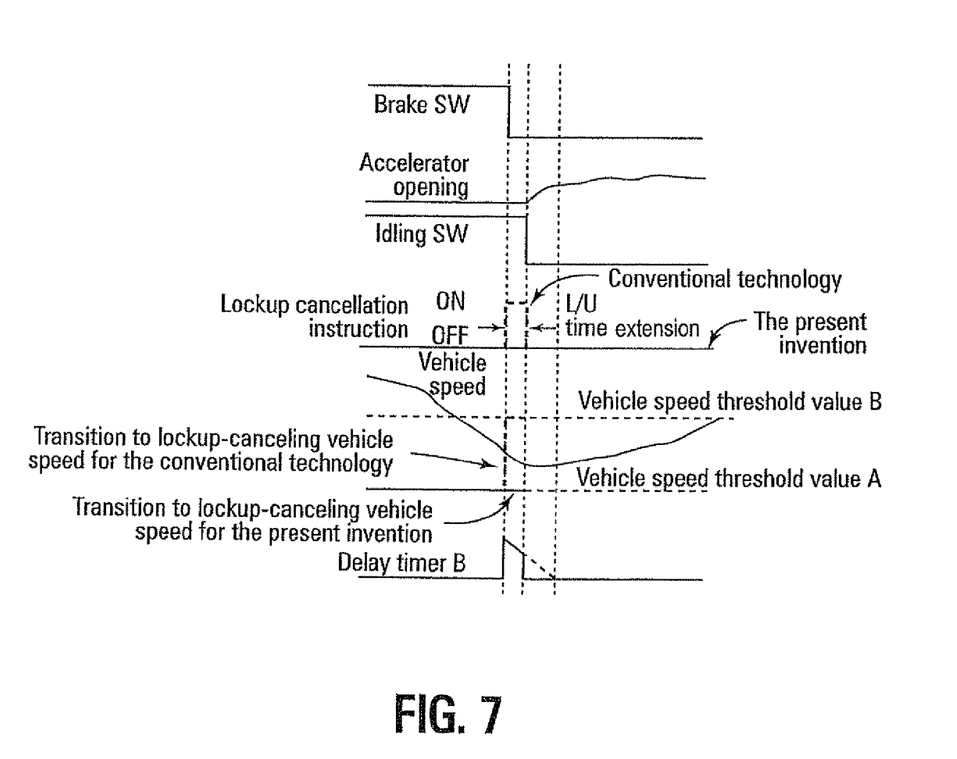
FIG. 7 is a time chart showing the acceleration status for when the brake is released (OFF) and the accelerator is activated (ON) in the lockup state.

FIG. 7 shows the brake released (OFF)/accelerator activated (ON) state under the lockup state when the vehicle is operating at a speed lower than lockup-canceling vehicle speed B and higher than lockup-canceling vehicle speed A with the brake activated (ON), whereby it is determined that the vehicle speed is lower than lockup canceling vehicle speed B that was set at the same time that the brake was released (OFF), as was the case in conventional technology, and the lockup state is cancelled, causing the engine rpm to rev up.

On the contrary, in the present invention (embodiment), delay timer B is activated after the brake is released (OFF) to set lockup-canceling vehicle speed A, so that the lockup cancellation instruction will not be issued after the accelerator is activated (ON). The lockup will not be cancelled and the lockup state will be maintained, thus preventing the revving up of the engine rpm and maintaining excellent drivability and favorable fuel consumption.

As shown above, the present invention provides a means to ensure the proper lockup period and maintain excellent fuel consumption and drivability.

Moreover, for the aforementioned embodiment, the device learns the time required for the driver to release the accelerator (OFF) and activate the brake (ON) and the time required to release the brake (OFF) and activate the accelerator (ON) and delays the switching of the lockup-canceling vehicle speeds for this period of learned time in order to provide optimum control for each driver.

Furthermore, for the aforementioned embodiment, the delay time required for switching between lockup-canceling vehicle speeds is cleared when the vehicle deceleration is large, and is set to be shorter than the time from when the fuel-cut conditions are met and the fuel cutting is started when the accelerator is released (OFF) and the brake is activated (ON) in order to suppress the occurrence of the feeling of discomfort that takes place when the engine brake is applied during the delay time.

CONCLUSION

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A transmission lockup controller, comprising:
 a transmission controller configured to delay for a predetermined time period before changing a vehicle speed threshold for canceling a torque converter lockup state from a first speed threshold to a second speed threshold when transitioning out of an accelerator ON state or out of a brake ON state, where the first speed threshold is lower than the second speed threshold.

2. The transmission lockup controller of claim 1, wherein the predetermined time period is a first time period when transitioning out of an accelerator ON state and a second time period when transitioning out of a brake ON state.

3. The transmission lockup controller of claim 2, wherein the first time period is a learned value for a driver transition from the accelerator ON state to the brake ON state and the second time period is a learned value for a driver transition from the brake ON state to the accelerator ON state.

4. The transmission lockup controller of claim 1, wherein the transmission controller is configured to utilize the first speed threshold in an accelerator OFF and brake ON state and to utilize the second speed threshold in an accelerator OFF and brake OFF state.

5. The transmission lockup controller of claim 1, wherein the transmission controller is further configured to clear any remaining portion of the predetermined time period and to change the vehicle speed threshold to the second speed threshold if a deceleration is greater than a deceleration threshold value.

6. An engine and transmission system, comprising:
an engine;
an automatic transmission; and
a controller configured to delay for a predetermined period of time before changing a vehicle speed threshold for canceling a lockup state of the automatic transmission from a first speed threshold to a second speed threshold when detecting a status shift from an accelerator ON state to an accelerator OFF state.

7. The engine and transmission system of claim 6, wherein the first speed threshold is lower than the second speed threshold.

8. The engine and transmission system of claim 6, wherein the controller is configured to utilize the first speed threshold in an accelerator OFF and brake ON state and to utilize the second speed threshold in an accelerator OFF and brake OFF state.

9. The engine and transmission system of claim 6, wherein the automatic transmission is a continuously variable transmission (CVT).

10. The engine and transmission system of claim 6, wherein the predetermined time period is a learned value for a driver transition from the accelerator ON state to a brake ON state.

11. The engine and transmission system of claim 6, wherein the the controller is configured to clear any remaining portion of the predetermined time period and to change the vehicle speed threshold to the second speed threshold if a deceleration is greater than a deceleration threshold value.

12. The engine and transmission system of claim 6, wherein the controller is configured to set the predetermined time period to a fuel cut time if the fuel cut time is less than a default predetermined time period.

13. An engine and transmission system, comprising:
an engine;
an automatic transmission; and
a controller configured to delay for a predetermined period of time before changing a vehicle speed threshold for canceling a lockup state of the automatic transmission from a first speed threshold to a second speed threshold when detecting a status shift from a brake ON state to a brake OFF state.

14. The engine and transmission system of claim 13, wherein the first speed threshold is lower than the second speed threshold.

15. The engine and transmission system of claim 13, wherein the controller is configured to utilize the first speed threshold in an accelerator OFF and brake ON state and to utilize the second speed threshold in an accelerator OFF and brake OFF state.

16. The engine and transmission system of claim 13, wherein the automatic transmission is a continuously variable transmission (CVT).

17. The engine and transmission system of claim 13, wherein the predetermined time period is a learned value for a driver transition from the brake ON state to an accelerator ON state.

18. The engine and transmission system of claim 13, wherein the controller is configured to clear any remaining portion of the predetermined time period and to change the vehicle speed threshold to the second speed threshold if a deceleration is greater than a deceleration threshold value.

19. A vehicle, comprising:
an engine coupled to an automatic transmission; and
a controller coupled to the engine and the automatic transmission and configured to delay for a predetermined period of time before changing a canceling-speed threshold at which to cancel a lockup state of the automatic transmission from a first canceling-speed threshold to a second canceling-speed threshold when detecting a status shift out of an accelerator ON state or out of a brake ON state.

20. The vehicle of claim 19, wherein the predetermined time period is a first time period when transitioning out of the accelerator ON state and a second time period when transitioning out of the brake ON state.

21. The vehicle of claim 20, wherein the first time period is a learned value for a driver transition from the accelerator ON state to the brake ON state and the second time period is a learned value for a driver transition from the brake ON state to the accelerator ON state.

22. The vehicle of claim 19, wherein the first canceling-speed speed threshold is lower than the second canceling-speed speed threshold, and the controller is configure to utilize the first canceling-speed speed threshold in an accelerator OFF and brake ON state and to utilize the second canceling-speed speed threshold in an accelerator OFF and brake OFF state.

23. The vehicle of claim 19, wherein the the controller is configured to clear any remaining portion of the predetermined period of time and to change the canceling-speed threshold to the second canceling-speed threshold if a deceleration is greater than a deceleration threshold value.

24. A method of operating an engine and transmission system, comprising:
detecting a status shift out of an accelerator ON state or out of a brake ON state; and
delaying for a predetermined period of time after detecting the status shift before changing a transmission lockup canceling-speed threshold from a first transmission lockup canceling-speed threshold to a second transmission lockup canceling-speed threshold.

25. The method of claim 24, comprising:
selecting a first predetermined time period for the predetermined period of time when transitioning out of the accelerator ON state; and
selecting a second predetermined time period for the predetermined period of time when transitioning out of the brake ON state.

26. The method of claim 25, wherein the first predetermined time period is a learned value for a driver transition from the accelerator ON state to the brake ON state and the second predetermined time period is a learned value for a driver transition from the brake ON state to the accelerator ON state.

27. The method of claim 24, wherein the first transmission lockup canceling-speed threshold is lower than the second transmission lockup canceling-speed threshold, the method further comprising:
utilizing the first transmission lockup canceling-speed threshold in an accelerator OFF and brake ON state; and
utilizing the second transmission lockup canceling-speed threshold in an accelerator OFF and brake OFF state.

28. The method of claim 24, further comprising:
clearing any remaining portion of the predetermined period of time and changing the transmission lockup canceling-speed threshold to the second transmission lockup canceling-speed threshold if a deceleration is greater than a deceleration threshold value.

29. A method of operating a lockup controller of a vehicle including an automatic transmission, comprising:
detecting a status shift from an accelerator ON state to an accelerator OFF state; and
delaying for a predetermined period of time after detecting the status shift before changing a speed threshold at which to cancel of a lockup state of the automatic transmission from a first speed threshold to a second speed threshold.

30. The method of claim 29, wherein the predetermined time period is a learned value for a driver transition from the accelerator ON state to a brake ON state.

31. The method of claim 29, wherein the first speed threshold is lower than the second speed threshold, the method further comprising:
utilizing the first speed threshold in an accelerator OFF and brake ON state; and
utilizing the second speed threshold in an accelerator OFF and brake OFF state.

32. The method of claim 29, further comprising:
clearing any remaining portion of the predetermined period of time and changing the speed threshold to the second speed threshold if a deceleration is greater than a deceleration threshold value.

33. The method of claim 29, further comprising:
setting the predetermined time period to a fuel cut time if the fuel cut time is less than a default predetermined time period.

34. A method of operating a lockup controller of an automatic transmission of a vehicle, comprising:
detecting a status shift from a brake ON state to a brake OFF state; and
delaying for a predetermined period of time after detecting the status shift before changing a speed threshold at which to cancel of a lockup state of the automatic transmission from a first speed threshold to a second speed threshold.

35. The method of claim 34, wherein the predetermined time period is a learned value for a driver transition from the brake ON state to an accelerator ON state.

36. The method of claim 34, wherein the first speed threshold is lower than the second speed threshold, the method further comprising:
utilizing the first speed threshold in an accelerator OFF and a brake ON state; and
utilizing the second speed threshold in an accelerator OFF and brake OFF state.

37. The method of claim 34, further comprising:
clearing any remaining portion of the predetermined period of time and changing the speed threshold to the second speed threshold if a deceleration is greater than a deceleration threshold value.

* * * * *